United States Patent
Balderer et al.

(10) Patent No.: US 7,716,152 B2
(45) Date of Patent: May 11, 2010

(54) USE OF SEQUENTIAL NEAREST NEIGHBOR CLUSTERING FOR INSTANCE SELECTION IN MACHINE CONDITION MONITORING

(75) Inventors: Christian Balderer, Niederhasu (CH); Claus Neubauer, Monmouth Junction, NJ (US); Chao Yuan, Secaucus, NJ (US)

(73) Assignee: Siemens Aktiengesellschaft, Munich (DE)

(*) Notice: Subject to any disclaimer, the term of this patent is extended or adjusted under 35 U.S.C. 154(b) by 279 days.

(21) Appl. No.: 12/048,381

(22) Filed: Mar. 14, 2008

(65) Prior Publication Data

US 2009/0043536 A1 Feb. 12, 2009

Related U.S. Application Data

(63) Continuation of application No. 11/565,805, filed on Dec. 1, 2006, now abandoned.

(60) Provisional application No. 60/742,505, filed on Dec. 5, 2005.

(51) Int. Cl.
*G06N 5/00* (2006.01)

(52) U.S. Cl. ............................. 706/45; 706/20; 382/226

(58) Field of Classification Search .................. 706/20, 706/45; 382/224–228; 702/81, 82, 183
See application file for complete search history.

(56) References Cited

U.S. PATENT DOCUMENTS

| | | | | |
|---|---|---|---|---|
| 6,052,485 | A  * | 4/2000 | Nelson et al. | 382/225 |
| 2004/0096100 | A1* | 5/2004 | Ii et al. | 382/159 |
| 2007/0143038 | A1* | 6/2007 | Yuan et al. | 702/35 |
| 2007/0162241 | A1* | 7/2007 | Yuan et al. | 702/81 |
| 2008/0091715 | A1* | 4/2008 | Yan et al. | 707/103 R |

OTHER PUBLICATIONS

Berchtold et al., Fast Nearest Neighbor Search in High-dimensional Space, 1998, 14th International Conference on Data Engineering (ICDE'98),10 pages.*
Bentley, Jon Louis, K-d Trees for Semidynamic Point Sets, 1990, ACM 0-89791-362-0/90/0006/0187, pp. 187-197.*
Anderson, Richard, Nearest Neighbor Trees and N-body Simulation, 1994, Dept. of Computer Science, Indian Institute of Science, Bangalore, 560012, pp. 1-13.*

* cited by examiner

*Primary Examiner*—David R Vincent

(57) ABSTRACT

A method is provided for selecting a representative set of training data for training a statistical model in a machine condition monitoring system. The method reduces the time required to choose representative samples from a large data set by using a nearest-neighbor sequential clustering technique in combination with a kd-tree. A distance threshold is used to limit the geometric size the clusters. Each node of the kd-tree is assigned a representative sample from the training data, and similar samples are subsequently discarded.

10 Claims, 5 Drawing Sheets

```
foreach p in S {
    nearestCluster = kd.nearestNeighbor(p, r_max);
    if (nearestCluster == null) {
        newCluster = new Cluster();
        newCluster.add(p);
        kd.add(newCluster);
    } else {
        nearestCluster.add(p)
    }
}
```

*Fig. 4*

USE OF SEQUENTIAL NEAREST NEIGHBOR CLUSTERING FOR INSTANCE SELECTION IN MACHINE CONDITION MONITORING

CROSS REFERENCE TO RELATED APPLICATIONS

This application is a continuation of U.S. patent application Ser. No. 11/565,805, filed Dec. 1, 2006, now abandoned which claims the benefit of U.S. Provisional Patent Application Ser. No. 60/742,505 entitled "Use of Sequential Clustering for Instance Selection in Machine Condition Monitoring," filed on Dec. 5, 2005, the contents of which are hereby incorporated by reference in their entirety.

FIELD OF THE INVENTION

The present invention relates generally to the field of machine condition monitoring, and more particularly, to techniques and systems for selecting representative training instances for use in training a statistical model for machine condition monitoring.

BACKGROUND OF THE INVENTION

Many manufacturing and service equipment installations today include, in addition to systems for controlling machines and processes, systems for machine condition monitoring. Machine condition monitoring systems include an array of sensors installed on the equipment, a communications network linking those sensors, and a processor connected to the network for receiving signals from the sensors and making determinations on machine conditions from those signals.

The purpose of machine condition monitoring is to detect faults as early as possible to avoid further damage to machines. Traditionally, physical models were employed to describe the relationship between sensors that measure performance of a machine. Violation of those physical relationships could indicate faults. However, accurate physical models are often difficult to acquire.

An alternative to the use of physical models is the use of statistical models based on machine learning techniques. That approach has gained increased interest in recent decades. In contrast to a physical model, which assumes known sensor relationships, a statistical model learns the relationships among sensors from historical data. That characteristic of the statistical models is a big advantage in that the same generic model can be applied to different machines. The learned models differ only in their parameters.

There are two basic types of statistical models used in machine condition monitoring: a regression-based model and a classification-based model. In a regression model, a set of sensors is used to predict (or estimate) another sensor. Since a regression model can produce a continuous estimate, the deviation of the actual value from the estimate can be used directly for fault diagnosis. For example, a simple logic can be built as "the larger the deviation, the greater the chance of a fault."

In a classification-based model, the output is discrete. One application of a classification-based model is an out-of-range detector, wherein a one-class classifier is often employed. A one-class classifier output indicates whether there is an out-of-range condition or not.

To be able to use statistical models for machine condition monitoring, it is necessary to train the model based on labeled historical data. In a classification-based model, a data point label may be either "normal" (representing good data) or "abnormal" (representing data indicating a fault).

One approach to training is to include all available data in the training set. The advantage of an all-inclusive approach is that the trained statistical model is expected to generalize well, because the training data covers most variations that may occur in future. Two issues, however, exist in that approach. First, there may be too much training data, making the training process time-consuming or even intractable. Second, much of the data may be very similar. It is not necessary to use similar training samples. Similar data may furthermore cause over-training if, during the selected training period, the machine happens to be working in the same mode for most of the time. Simple sub-sampling can solve the first of the above issues, but not the second. Sub-sampling may also cause loss of useful data points. A human operator can manually select training instances; however, such a process is tedious and also intractable if multiple sensors are present in a model.

There is therefore a need for an improved method for selecting training data. Such an improved method would find representative training instances and at the same time reduce data redundancy.

One approach might be to use standard clustering techniques to cluster the training data, and then use each cluster center as a selected instance. The two most frequently used clustering algorithms are the k-means algorithm and the ISODATA clustering algorithm. Both of those algorithms are iterative procedures. For the k-means algorithm k cluster centers are initially randomly selected. Each training sample is assigned to the closest cluster based on the distance from the sample to the cluster center. Then all cluster centers are updated based on the new assignments. The process is repeated until it converges.

The ISODATA algorithm is more advanced in that it is able to split and merge clusters. A cluster is merged with another cluster if the cluster is too small or very close to another cluster. A cluster is split if it is too big or its standard deviation exceeds a predefined value.

Neither algorithm, however, is appropriate for use in selecting training data in the present application, for at least two reasons. First, both the k-means and ISODATA algorithms create a virtual data point, while the present application requires selecting a real data point. Second, both clustering methods lack a precise control of the geometric size of each cluster. For example, the technique may yield a number of large clusters. The center of a large cluster is not representative of all its members, because the distance between the members is too large.

There is therefore presently a need for a method for selecting training data from a large data set. That method should limit the number of training samples, while assuring that the selected samples are representative of the data.

SUMMARY OF THE INVENTION

The present invention addresses the needs described above by providing a method for selecting a set of training data from a set S of samples from a machine condition monitoring system. The selected set of training data is for use in training a statistical model for evaluating measurements in the machine condition monitoring system.

The method initially performs the following steps for each sample p from the set S: calculating a distance from the sample p to a node of a kd-tree, wherein each node of the kd-tree is empty or represents another sample removed from the set S; if the calculated distance is greater than a distance threshold $r_{max}$, and the node of the kd-tree has children, calculating a distance from the sample p to a child of the node selected according to a classification of p in the kd-tree; repeating the previous step until either the calculated distance is below the distance threshold $r_{max}$, or the node of the kd-tree has no children; and if no calculated distance is below the distance threshold $r_{max}$, then populating a next leaf in the kd-tree with p. After the steps are performed on each sample p, the nodes of the kd-tree are used as the set of training data.

The method may further include the step of randomizing an order of the samples p in the training set S.

The distance $r_{max}$ may be determined as $r_{max}=r_0\sqrt{d}$ where $r_0$ is a predetermined constant and d is a number of sensors represented by the sample s. $r_0$ may empirically be set to $1/33$.

The step of performing the steps for each sample p from the set S may further comprise backtracking in the kd-tree if a nearest cluster center for a sample p is not in located in the hypercube of the kd-tree specified by the cluster center.

Another embodiment of the invention is a method for training a statistical model for evaluating measurements in a machine condition monitoring system, using a set S of data samples from the machine condition monitoring system. The method comprises the steps of clustering the samples in S into a plurality of clusters by comparing each sample p with a subset of the other samples of S, the subset of the other samples of S being selected using a kd-tree having nodes corresponding to data samples from S; and training the statistical model using a single value from each cluster of the plurality of clusters.

In another embodiment of the invention, a computer-usable medium is provided having computer readable instructions stored thereon for execution by a processor to perform the methods described above.

BRIEF DESCRIPTION OF THE DRAWINGS

FIG. 4 is a pseudocode listing representing a method according to one embodiment of the invention.

DESCRIPTION OF THE INVENTION

Figure 1:
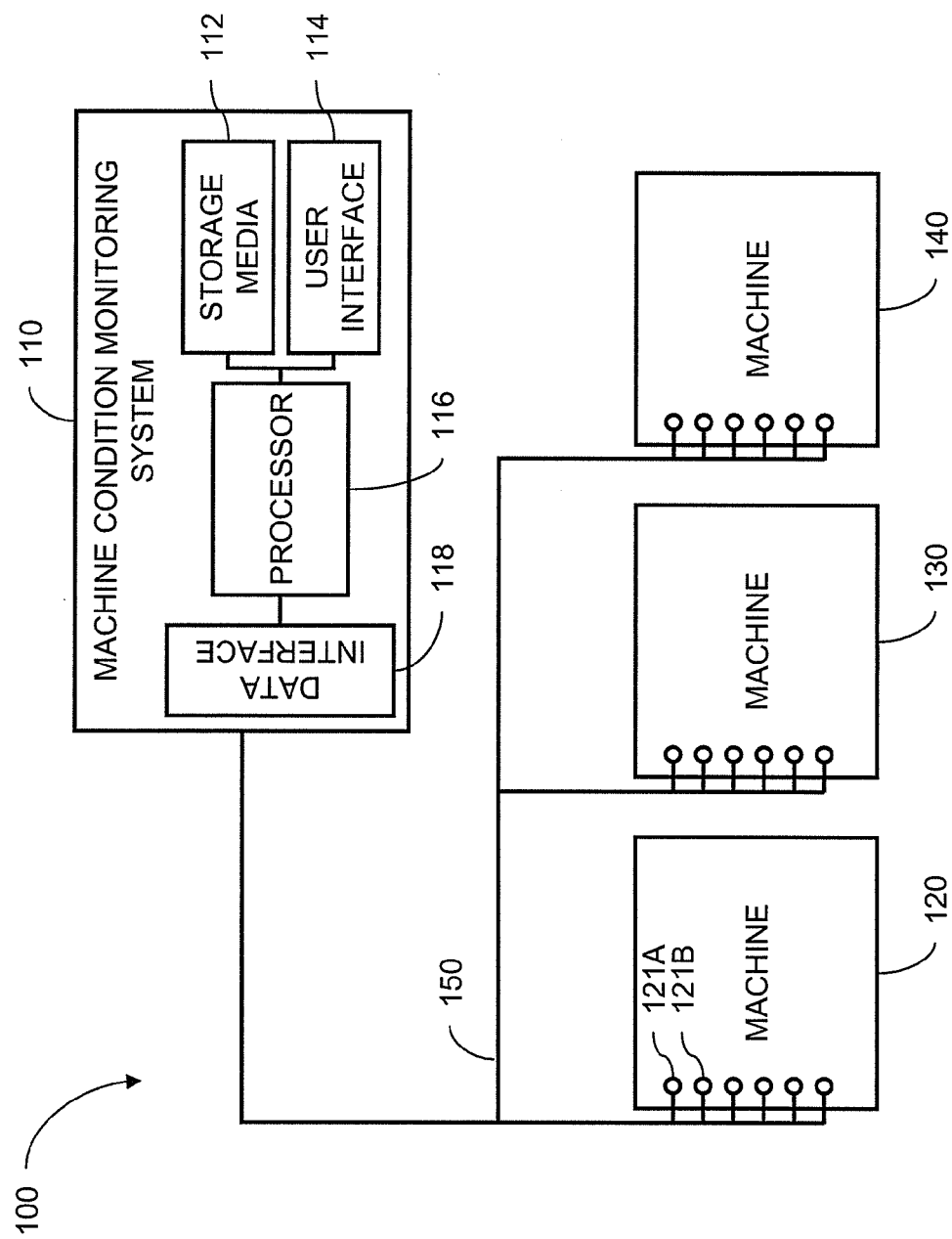
FIG. 1 is a schematic illustration of a machine monitoring system according to one embodiment of the invention.

A system 110 for monitoring conditions of machines 120, 130, 140 according to one embodiment of the invention is shown in FIG. 1. The system includes a plurality of machine sensors such as the sensors 121A, 121B connected to machine 120. The sensors may, for example, be accelerometers, temperature sensors, flow sensors, position sensors, rate sensors, chemical sensors or any sensor that measures a condition of a machine or process. The sensors measure conditions chosen because they are related in predictable ways that reflect the presence or absence of normal operating conditions in an installation 100.

The sensors 121A, 121B are connected through a data network 150 to a data interface 118 in the machine condition monitoring system 110. A processor 116 receives the sensor data from the data interface 118 and performs the monitoring methods of the invention. The processor is connected to storage media 112 for storing computer-readable instructions that, when executed, perform the monitoring methods. The storage media 112 may also store historical data received from the sensors 121A, 121B. A user interface 114 is provided for communicating results to and receiving instructions from a user.

The present invention applies a new sequential clustering method to select representative training instances. The clustering method constrains the geometric size of each cluster and thus avoids the large-cluster problems caused by k-means or ISODATA clustering methods. The method requires only one scan of all training data, in contrast to the iterative procedures of the above-described standard clustering methods. The method furthermore utilizes a kd-tree to further speed up the clustering process.

Initially, the training data may be normalized by making the data from each sensor have a zero mean and have a standard deviation of 1. That is done to remove different offsets and scales present in different sensors.

The clustering method will now be described. Let S denote the original training set and p denote a training sample in S. A selected instance set is denoted as Q. $r_{max}$ is a distance threshold. Initially, Q is empty.

The following is an algorithm in accordance with the invention for sequential nearest neighbor clustering:

for each p in S, do the following:
remove p from S
if Q is empty or the nearest neighbor distance between p
and each instance in Q>$r_{max}$, then
add p to Q.

In the above algorithm, $r_{max}$ is an important parameter that indicates the geometric size of each cluster. In a preferred embodiment of the invention, $r_{max}=r_0\sqrt{d}$, where $r_0$ is a constant and d is the data dimension (the number of sensors). The inventors have empirically picked $r_0=1/33$.

To further improve the speed of the method, the inventors have employed a kd-tree algorithm in the sequential nearest neighbor searching part of the clustering algorithm described above.

Figure 2:
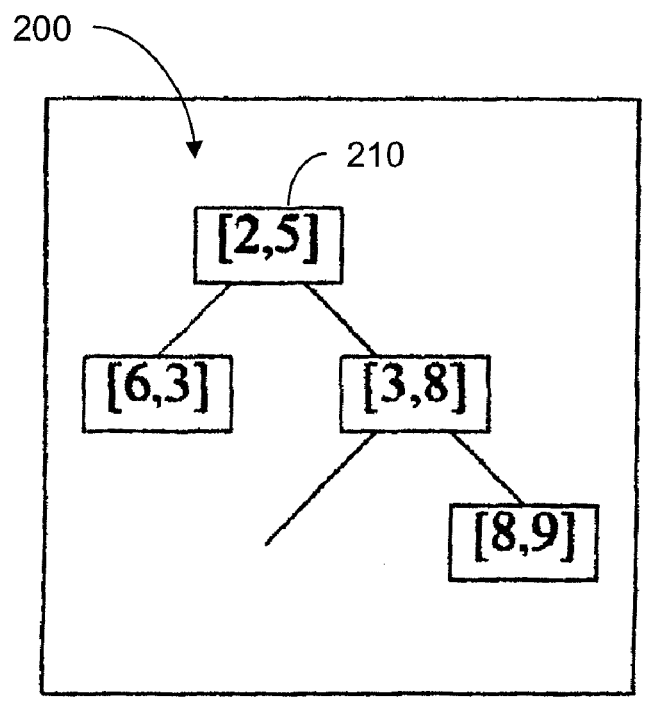
FIG. 2 is a chart showing a kd-tree according to one embodiment of the invention.
Figure 3:
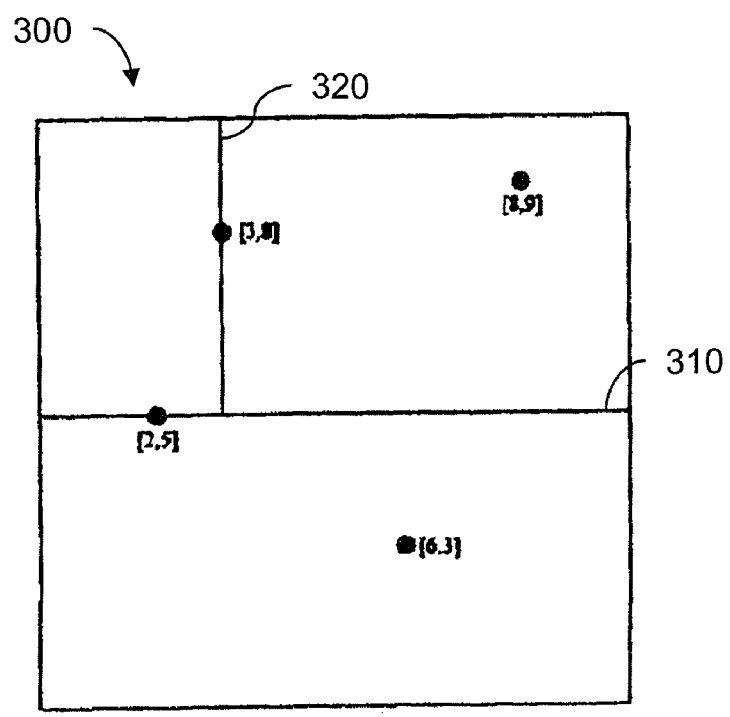
FIG. 3 is a chart showing space partitioned by a kd-tree according to one embodiment of the invention.

A kd-tree is described with reference to FIGS. 2 and 3. A kd-tree is the multidimensional generalization of a binary search tree. Each node on the exemplary tree of FIG. 2 is a selected training instance. In the case shown, [2,5] is the first training sample in S; thus, it becomes the root 210 of the tree 200 and also the first cluster center. Each node of the tree 200 defines a partition of the entire d-dimensional space.

On the first level of the tree the space 300 (FIG. 3) is split (line 310) according to the y-coordinate, on the second level according to the x-coordinate (line 320), etc. For data having dimensions greater than two, the third, fourth and higher dimensions are used for splitting at subsequent levels. A kd-tree splits the entire space into separated hypercubes and offers a fast searching ability to locate a hypercube containing an input.

The inventors have integrated the kd-tree algorithm in the sequential nearest neighbor clustering algorithm described above. Initially, the order of the training samples in S is randomized to remove the temporal dependency for the values of each sensor. That preprocessing causes the results to approximate a balanced binary tree.

For each training sample p in S, a distance is calculated between p and a node (initially the root) of the kd-tree. If the distance is less than $r_{max}$, then p is determined to be already represented by the node, and that p is dropped.

If the distance is not less than $r_{max}$, then the method traces down the kd-tree to locate the hypercube in which p lies. If p doesn't belong to any of the existing clusters, p becomes a new leaf of the kd-tree.

A pseudocode representation of a method according to the invention is shown in FIG. 4. The method incorporates the kd-tree algorithm into the sequential nearest neighbor clustering discussed above. Note that the nearest cluster center for an input is not necessarily located in a hypercube specified by the cluster center. It is therefore necessary to do a certain amount of backtracking. For example, in the tree shown in FIG. 3, a new input [3.1 5.1] would follow the branch [2, 5]→[3, 8] and would not find a match. That input, however, is actually very close to and should belong to node [2, 5] that it just passed. Backtrack assures correct placement in such a situation.

If m is used to denote the average number of backtracks, the whole algorithm typically needs O(n(log k+m)) time for all n data points, O being a standard notation indicating an asymptotic upper bound. Without the kd-tree, it is necessary to calculate a distance from p to each of the cluster centers. In that case, we require O(nk) time is required. Since typically k>>log k+m, use of the kd-tree significantly speeds up the clustering process.

Figure 6:
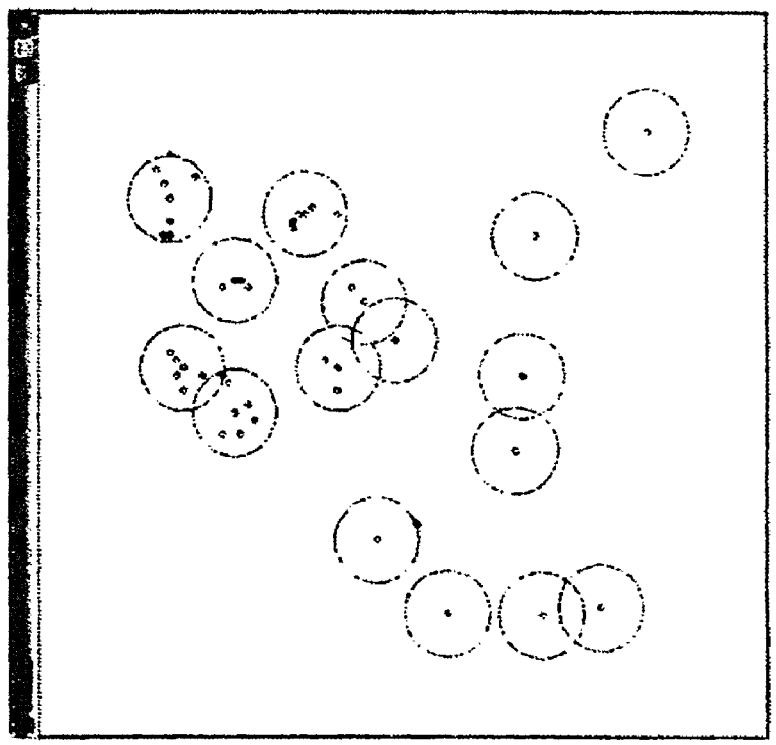
FIG. 6 is a plot showing clustering of data using a method according to one embodiment of the invention.

The method of the invention was compared to a k-means technique using forty-six 2-dimensional training data samples (i.e., the size of S is 46). The results are shown graphically in FIG. 5 (the k-means approach) and FIG. 6 (the method of the present invention). The clustering approach of the present invention automatically selects 16 instances, shown within the 16 circles of equal radius in FIG. 6. The circles have radius $r_{max}$ centered at each instance.

Figure 5:
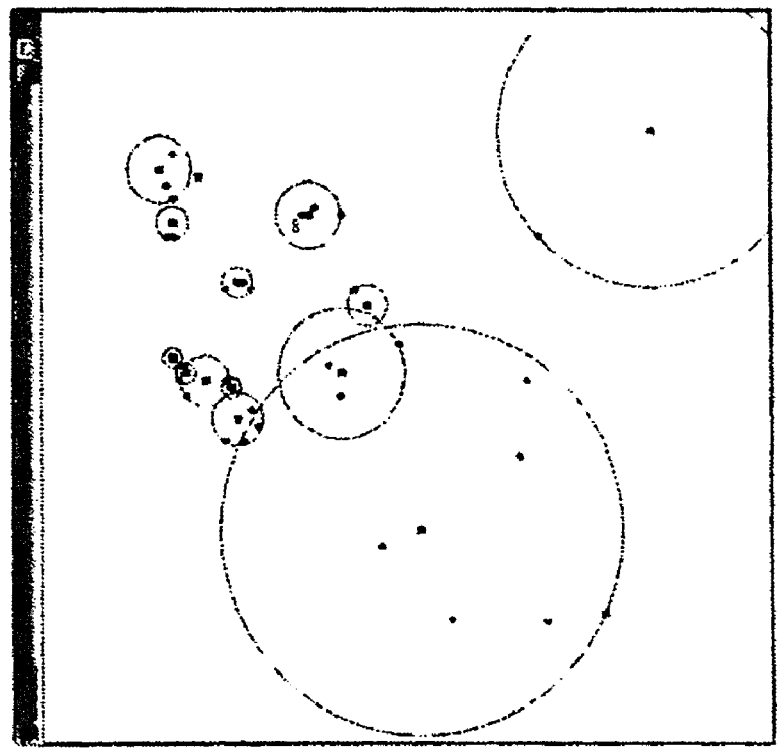
FIG. 5 is a plot showing clustering of data using a k-means algorithm.

The results applying a k-means algorithm with k=16 to the data are shown in FIG. 5. For comparison to the results of the presently-described technique, a circle is drawn for each cluster center of the figure. The radius of each circle is equal to the maximum distance from a cluster member to the cluster center. The k-means technique produces clusters having a large variation in geometric sizes. The cluster center of a very large cluster is not representative of its cluster members. For example, several samples in the largest cluster in FIG. 5 should have been selected as representative instances. The method of the present invention may be seen to produce more representative training instances.

Figure 7:
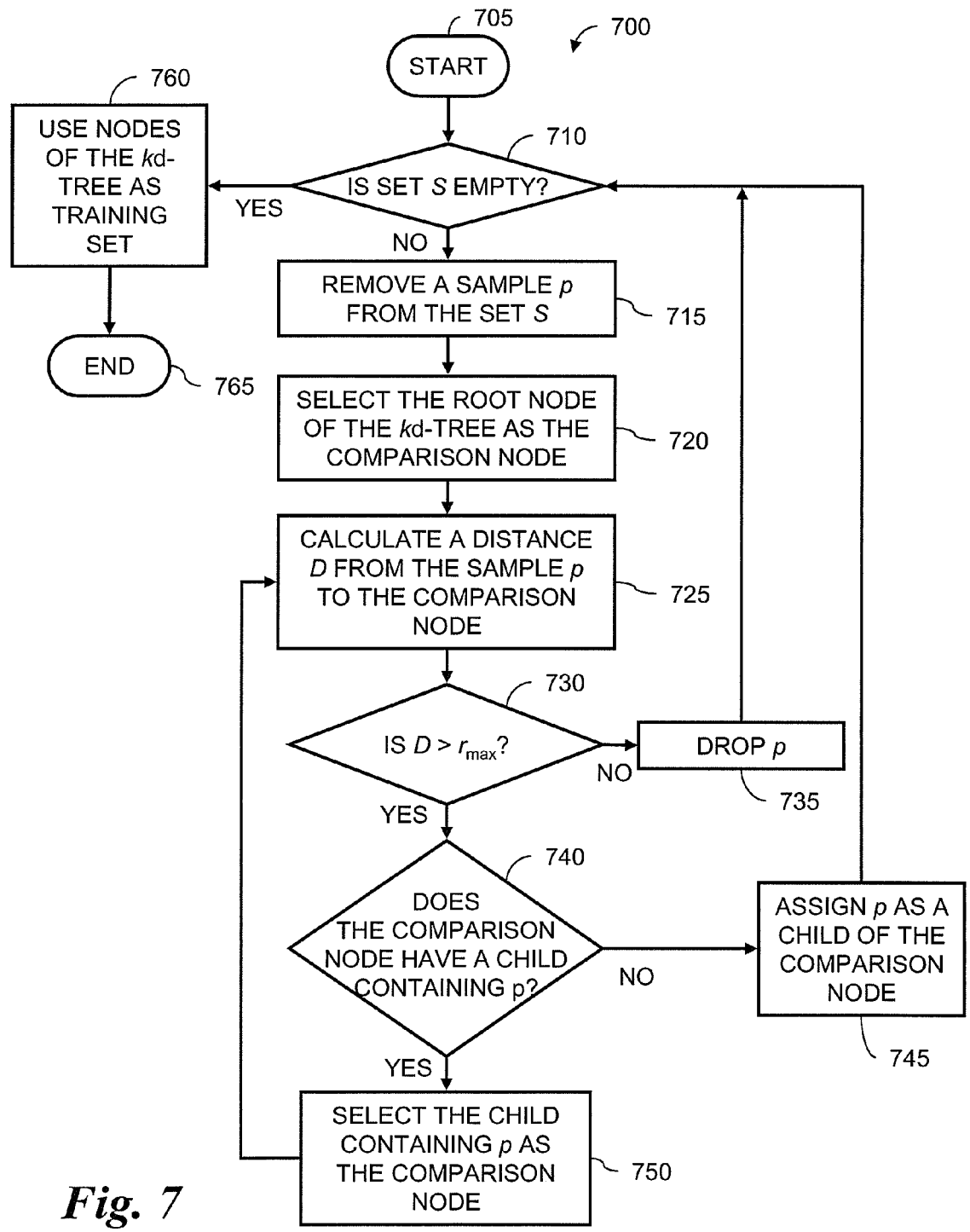
FIG. 7 is a flow chart representing a method according to one embodiment of the invention.

A flow chart 700 showing a method according to one embodiment of the invention is shown in FIG. 7. The method starts (step 705) by checking (step 710) whether the sample set S is empty. If samples remain in the sample set, a single sample p is removed (step 715) from the sample set S for processing. The root node of the kd-tree is initially selected (step 720) as a comparison node. Initially, the kd-tree is completely empty, in which case the first sample p is assigned as the root node (not shown), and the method continues.

A distance D is calculated (step 725) from the sample p to the comparison node (in the first iteration, the root node). If the distance D is not greater than the threshold distance $r_{max}$ (decision 730), then that indicates that the sample p is already represented by the comparison nodes and p is dropped (step 735) and the method returns to remove another sample from the set S.

If the distance D is greater than the threshold distance $r_{max}$ (decision 730), then it is determined whether the comparison node of the kd-tree has a child containing p (decision 740). If not, then p is assigned as a child of the comparison node (step 745) and the method returns to remove another sample from the set S.

If the comparison node has children, then the child of the comparison node containing p is selected as the comparison node, and the method continues with calculating another distance (step 725).

Once all samples in the set S have been processed (decision 710), the nodes of the resulting kd-tree are used (step 760) as the training set, and the method terminates (step 765).

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. For example, while the method is disclosed herein as describing clustering methods for preparing training data for a machine condition monitoring system, the method may be used in any statistical evaluation system wherein data must be clustered, while remaining within the scope of the invention. It is to be understood that the embodiments shown and described herein are only illustrative of the principles of the present invention and that various modifications may be implemented by those skilled in the art without departing from the scope and spirit of the invention.

What is claimed is:

1. A computer implemented sequential nearest neighbor clustering method for selecting a set of training data from a set S of samples from a machine condition monitoring system that includes an array of sensors, the selected set of training data being for use in training a statistical model for evaluating measurements in the machine condition monitoring system, the method comprising the steps of:

performing the following steps for each sample p from the set S:

calculating a distance from the sample p to a node of a kd-tree, wherein each node of the kd-tree is empty or represents another sample removed from the set S;

if the calculated distance is greater than a distance threshold $r_{max}$, wherein $r_{max}$ indicates the geometric size of a cluster, and the node of the kd-tree has children, calculating a distance from the sample p to a child of the node selected according to a classification of p in the kd-tree;

repeating the previous step until either the calculated distance is below the distance threshold $r_{max}$, or the node of the kd-tree has no children; and if no calculated distance is below the distance threshold $r_{max}$, then populating a next leaf in the kd-tree with p; and using the nodes of the kd-tree as the set of training data.

2. The method of claim 1, further comprising the step of: randomizing an order of the samples p in the training set S.

3. The method of claim 1, wherein the distance $r_{max}$ is determined as $$r_{max} = r_0 \sqrt{d}$$

where $r_0$ is a predetermined constant and d is a number of sensors represented by the sample s.

4. The method of claim 3, wherein $r_0$ is set to ⅓₃.

5. The method of claim 1, the step of performing the steps for each sample p from the set S further comprises: backtracking in the kd-tree if a nearest cluster center for a sample p is not located in a hypercube of the kd-tree specified by the cluster center.

6. A computer-usable medium having computer readable instructions stored thereon for execution by a processor to perform a sequential nearest neighbor clustering method for selecting a set of training data from a set S of samples from a machine condition monitoring system that includes an array of sensors, the selected set of training data being for use in training a statistical model for evaluating measurements in the machine condition monitoring system, the method comprising the steps of:

performing the following steps for each sample p from the set S:

calculating a distance from the sample p to a node of a kd-tree, wherein each node of the kd-tree is empty or represents another sample removed from the set S;

if the calculated distance is greater than a distance threshold $r_{max}$, wherein $r_{max}$ indicates the geometric size of a cluster, and the node of the kd-tree has children, calculating a distance from the sample p to a child of the node selected according to a classification of p in the kd-tree;

repeating the previous step until either the calculated distance is below the distance threshold $r_{max}$, or the node of the kd-tree has no children; and if no calculated distance is below the distance threshold $r_{max}$, then populating a next leaf in the kd-tree with p; and using the nodes of the kd-tree as the set of training data.

7. The computer useable medium of claim 6, further comprising the step of:

randomizing an order of the samples p in the training set S.

8. The computer useable medium of claim 6, wherein the distance $r_{max}$ is determined as $$r_{max} = r_0 \sqrt{d}$$

where $r_0$ is a predetermined constant and d is a number of sensors represented by the sample s.

9. The computer useable medium of claim 8, wherein $r_0$ is set to 1/33.

10. The computer useable medium of claim 6, the step of performing the following steps for each sample p from the set S further comprises: backtracking in the kd-tree if a nearest cluster center for a sample p is not located in hypercube of the kd-tree specified by the cluster center.

* * * * *